United States Patent [19]

Speer

[11] Patent Number: 4,896,957
[45] Date of Patent: Jan. 30, 1990

[54] NOSE PAD FOR EYEGLASSES

[76] Inventor: Herbert Speer, Weberstrasse 48 (BRD), D-7531 Eisingen, Fed. Rep. of Germany

[21] Appl. No.: 287,596

[22] Filed: Dec. 19, 1988

Related U.S. Application Data

[63] Continuation of Ser. No. 69,381, Jul. 1, 1987, abandoned.

[30] Foreign Application Priority Data

Nov. 10, 1986 [DE] Fed. Rep. of Germany ....... 3638311

[51] Int. Cl.$^4$ .................................................. G02C 5/12
[52] U.S. Cl. .................................... 351/137; 351/136; 351/138
[58] Field of Search ...................... 351/76, 78, 80, 136, 351/137, 138

[56] References Cited

U.S. PATENT DOCUMENTS 4,500,179  2/1985  Schönhut ............................. 351/137

FOREIGN PATENT DOCUMENTS 1401735  4/1965  France ................................ 351/137

Primary Examiner—P. M. Dzierzynski
Attorney, Agent, or Firm—Balogh, Osann, Kramer, Dvorak, Genova & Traub

[57] ABSTRACT

This invention relates to a nose pad assembly for use in eyeglasses. The nose pad assembly comprises a plastic nose pad and a mounting arm to be secured to the frame of the eyeglasses. Detent means are provided for resiliently interlocking a depending free end portion of the mounting arm with a boss on the rear of the nose pad so as to permit a limited pivotal movement of the nose pad about said free end portion. In one embodiment of the invention the boss of the nose pad is formed with a socket hole, which is open at its top end and closed at its bottom, and the detent means consist of a plurality of vertically spaced apart ball sockets formed in the elastic boundary surface of said socket hole and of a ball, which is formed at the extreme end of the free end portion of said mounting arm and interfits with said ball sockets. Said ball and each of said ball sockets is formed with flats, which in the assembly are radially spaced apart and cooperate with each other to limit the pivotal movement of said nose pad about said free end portion.

1 Claim, 3 Drawing Sheets

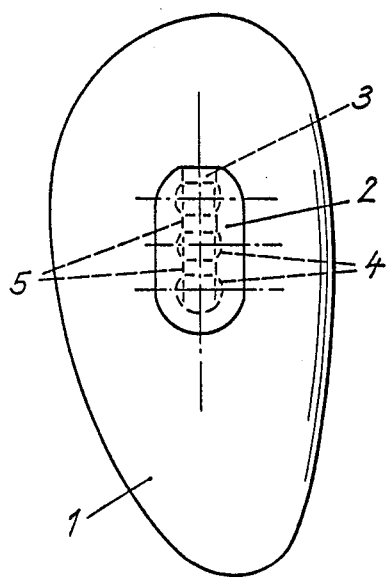
Fig.1
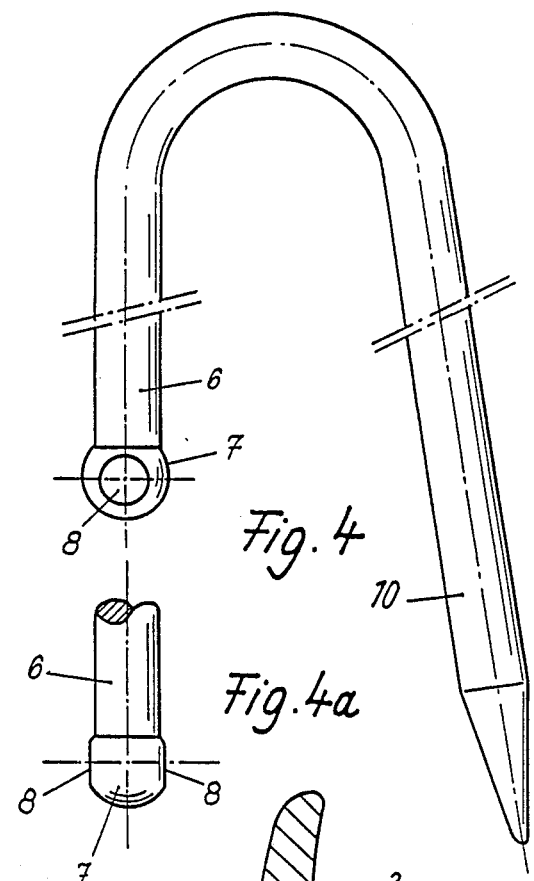
Fig.4
Fig.4a
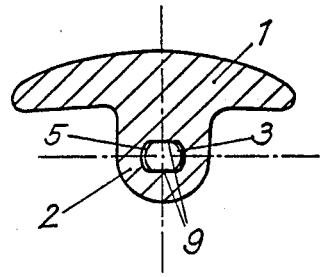
Fig.2
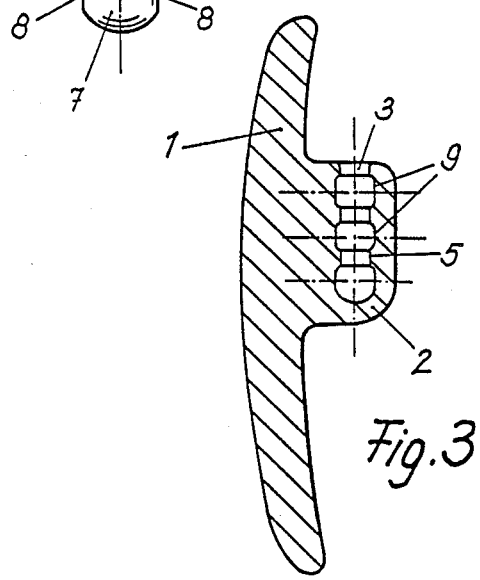
Fig.3

NOSE PAD FOR EYEGLASSES

This application is a continuation of application Ser. No. 07/069,381 now abandoned, filed July 1, 1987.

BACKGROUND OF THE INVENTION

1. Field of the Invention

This invention relates to a nose pad assembly comprising a plastic nose pad and a mounting arm, which is adapted to be secured to the frame of the eyeglasses and extends into and is resiliently locked in the rear portion of the nose pad.

2. Description of the Prior Art

French Patent 23 98 321 discloses a nose pad assembly comprising a plastic nose pad and a mounting arm having a ball end, which extends into and is resiliently locked in a ball socket of the pad. That arrangement does not permit of a vertical adjustment of the nose pad and permits a pivotal movement of the nose pad almost without a restriction.

EP-A 0067 373 discloses a mounting arm, which extends into and is resiliently locked in a through bore formed in a socket of the nose pad so that the latter is adjustable in height. But that nose pad is movable only in a vertical direction and cannot be pivotally moved in a lateral direction.

SUMMARY OF THE INVENTION

It is an object of the invention to provide a nose pad assembly in which the nose pad is vertically adjustable and is pivotally movable through a predetermined angle in a lateral direction.

In one embodiment of a nose pad assembly of the kind described first hereinbefore that object is accomplished in accordance with the invention in that the rear portion of the nose pad is formed in an elastic boundary surface of a socket hole which is open at its top and closed at its bottom with a plurality of vertically spaced apart ball sockets, which are separated by elastic lands, the mounting arm has a free end portion formed with an end ball, which is adapted to interfit with each of said ball sockets and is formed with lateral flats, and each of said ball sockets is formed with flats, which are radially spaced apart from and adapted to cooperate with said flats on said ball so as to laterally guide said ball in said socket hole with a limited freedom of lateral relative pivotal movement.

In another embodiment of a nose pad assembly of the kind described first hereinbefore that object is accomplished in accordance with the invention in that the rear portion of the nose pad is formed with a socket hole which is open at its top and closed at its bottom and with a transverse hole which opens at one end into said socket hole, the mounting arm has a free end portion that is formed with a plurality of vertically spaced apart socket depressions or holes, which are separated by ribs, said transverse hole contains a resiliently mounted ball or a resiliently mounted slider, which protrudes into said socket hole and cooperates with said depressions or holes of the mounting arm, so as to permit a vertical adjustment of the nose pad about the mounting area, the free end portion of the mounting arm is formed with flats, and the boundary surface of the socket hole is formed with flats which are radially spaced apart from and cooperate with said flats on the mounting arm to permit a limited lateral pivotal movement of said nose pad about said mounting arm.

BRIEF DESCRIPTION OF THE DRAWING

FIGS. 1 to 3 are, respectively, a rear elevation, a transverse sectional view and a longitudinal sectional view showing a nose pad of a first embodiment of the invention.

FIGS. 4 is a side elevation showing a mounting arm of the first embodiment.

FIG. 4a is a fragmentary elevation showing the free end portion of the mounting arm of FIG. 4 viewed at right angles to the view in FIG. 4.

DETAILED DESCRIPTION OF THE PREFERRED EMBODIMENTS

Figure 5:
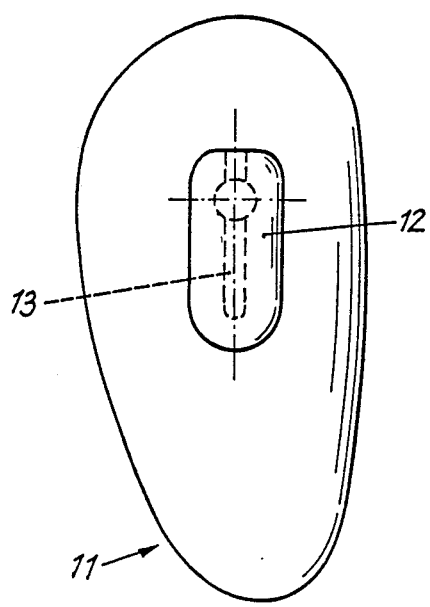
FIGS. 5 to 7 are, respectively, a rear elevation, a transverse sectional view and a longitudinal sectional view showing a nose pad of a second embodiment of the invention.

In the first embodiment shown in FIGS. 1 to 4a a nose pad 1 made of stiff elastic plastic has a rear portion consisting of a boss 2, which is formed with a socket hole 3 that is open at its top end and closed at its bottom and which in its elastic boundary surface is formed with a plurality of vertically spaced apart ball sockets 4, which communicate with each other through constricted passages defined by annular lands 5, which are formed on the elastic boundary surface of the hole 3 between adjacent ball sockets 4. The mounting arm 6 shown in FIG. 4 has a depending free end portion 6, which terminates in a detent ball 7, which has been inserted into the socket hole 3 and resiliently interfits with the socket holes 4. The detent ball 7 is formed on opposite sides with flats 8, which are radially spaced apart from and cooperate with complementary flats 9 formed in the boundary surface of the socket hole 3 in each of the ball sockets 4 so that the nose pad 1 is capable of a limited lateral pivotal movement about the free end portion 6. In the embodiment shown in FIGS. 1 to 4a the pad 1 and the mounting arm are assembled when they are in the orientation shown in FIGS. 2 and 4, on the one hand, and in FIGS. 3 and 4a, on the other hand. The other end portion 10 of the mounting arm is intended to be soldered to an eyeglass frame, which is not shown.

Figure 7:
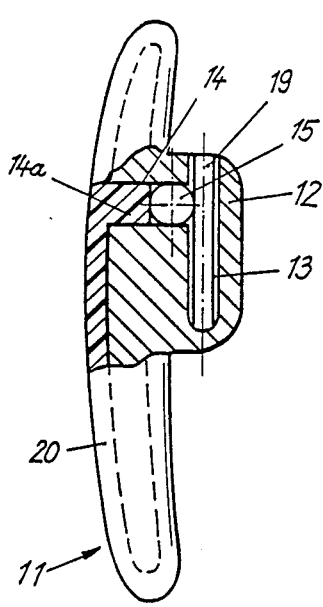
Figure 6:
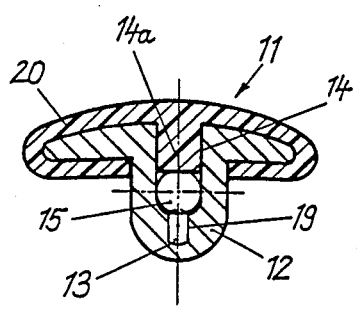
Figures 8, 8A:
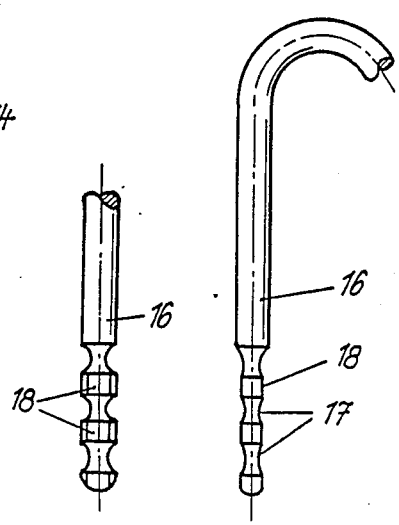
FIG. 8 is a side elevation showing a mounting arm of the second embodiment.
FIG. 8a is a fragmentary elevation showing the free end portion of the mounting arm of FIG. 8 viewed at right angles to the view in FIG. 8.

In the second embodiment shown in FIGS. 5 to 8 and 8a, the nose pad 11 has a rear portion, which consists of a boss 12 and is formed with a socket hole 13, which is open at its top end and closed at its bottom end, and with a transverse hole 14, which is transverse to the socket hole 13 and opens into the latter at one end of the hole 14. The transverse hole 14 contains an elastomeric buffer 14a and a detent ball 15, which protrudes into the socket hole 13 and on the side that is opposite to the socket hole 13 bears on the buffer 14. The mounting arm comprises a depending free end portion 16, which is formed in its periphery with a plurality of vertically spaced apart annular socket grooves 17, each of which is adapted to cooperate with the ball 15 when the free end portion is inserted into the socket hole 13. Adjacent annular grooves 17 are separated by annular lands, which are formed on opposite sides of the free end portion 16 with flats 18 for cooperation with two flats 19, which are formed by continuous vertical shoulders formed in the boundary surface of the socket hole 13. In that embodiment, the nose pad 11 is capable of a limited pivotal movement about the free end portion 16. In the embodiment shown in FIGS. 5 to 8a the nose pad 11 and the mounting arm are assembled when they have the orientation shown in FIGS. 6 and 8, on the one hand and in FIGS. 7 and 8a, on the other hand. In the second embodiment the elastomeric buffer 14a and an elastomeric covering 20 of the nose pad 11 are molded in the same operation and are preferably inserted into and applied to the hard plastic core of the nose pad in the same operation.

Figure 9:
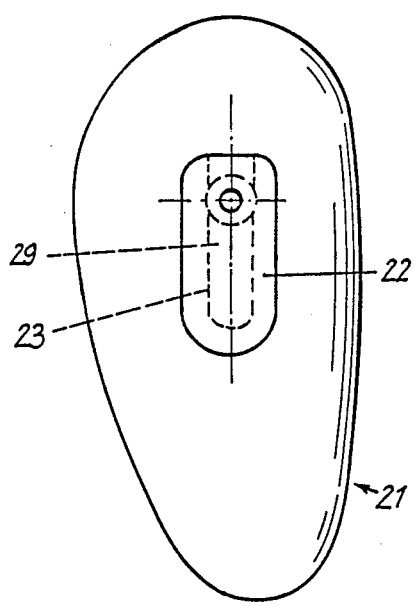
FIGS. 9 to 11 are, respectively, a rear elevation, a transverse sectional view and a longitudinal sectional view showing a nose of a third embodiment of the invention.
Figure 11:
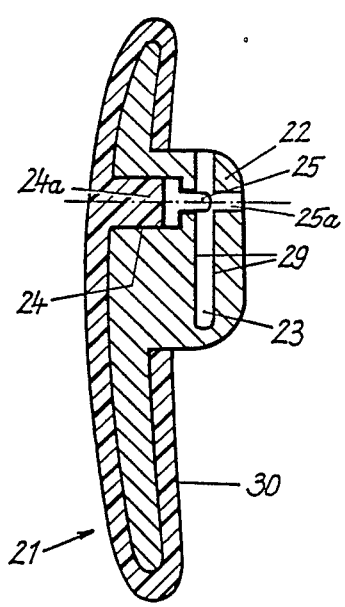
Figure 10:
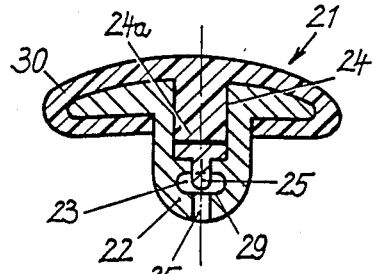
Figures 12, 12A:
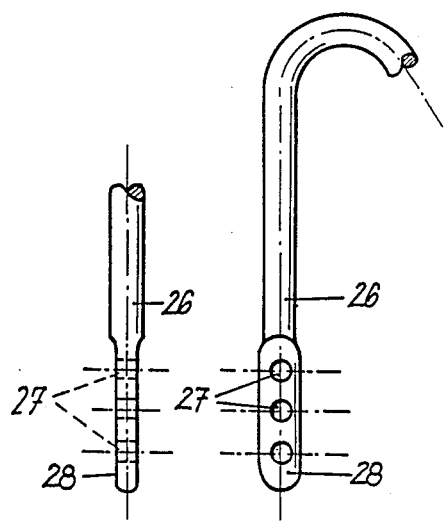
FIG. 12 is a side elevation showing a mounting arm of the third embodiment.
FIG. 12a is a fragmentary elevation showing the free end portion of the mounting arm of FIG. 12 viewed at right angles to the view in FIG. 12.

In the third embodiment shown in FIGS. 9 to 12 and 12a the nose pad 21 has a rear portion consisting of a boss 22, which is formed with a socket hole 23 that is open at its top end and closed at its bottom end, and with a transverse hole 24, which is transverse to and at one end opens into the socket hole 23. The transverse hole 24 contains an elastomeric buffer 24a and a detent slider 25, which is biased by the buffer 24a to protrude into the socket hole 23. On that side of the socket hole 23 that is opposite to the detent slider 25, the boss 22 is formed with a hole 25a, which opens into the socket hole 23 and registers with the detent slider 25 and is adapted to receive a slender implement for forcing the detent slider 25 out of the socket hole 23. The mounting arm has a depending free end portion 26, which is formed with vertically spaced apart holes 27, each of which is adapted to receive the detent slider 25 as the free end portion 26 is inserted into the socket hole 23. The free end portion 26 is formed on opposite sides with flats 28, which are adapted to cooperate with flats 29 formed on opposite sides of the boundary surface of the socket hole 23. Owing to the radial clearances between corresponding flats 28 and 29, the nose pad 21 is capable of a limited pivotal movement about the free end portion 26. In the third embodiment shown in FIGS. 9 to 12 the pad 21 and the mounting arm are assembled when they have the orientation shown in FIGS. 10 and 12, on the one hand, and in FIGS. 11 and 12a, on the other hand. In the third embodiment the elastomeric buffer 24a and the elastomeric covering 30 of the nose pad are molded in the same operation and are preferably inserted into and applied to the hard plastic core of the nose pad in the same operation.

In the second and third embodiments the flats 19 and 29, respectively, formed on opposite sides of the boundary surfaces of the socket holes 3 and 23 constitute elongate substantially parallel guiding surfaces which extend along said boundary surface. The boss and the free end portion are formed each on opposite sides with two substantially parallel flats and on opposite sides with two substantially parallel flats and in the assembly the flats on the free end portion are radially spaced apart from corresponding flats on the boundary surface of the socket hole so that the nose pad is pivotally movable about the free end portion of the mounting arm to an extent which depends on the clearances between corresponding flats of the boss and of the free end portion. That clearance may subsequently be changed if the extent of said pivotal movement is to be altered for an adaptation to a wearer of the eyeglasses.

I claim:
1. In a nose pad assembly for eyeglasses, which assembly comprises
    a plastic nose pad having a rear portion formed with a generally vertical socket hole, which is defined by a boundary surface and open at its top,
    a mounting arm having a depending free end portion extending into said hole from above, and
    detent means for resiliently and slidably interlocking said rear portion and said free end portion in a plurality of vertically spaced apart positions,
    the improvement residing in that
    said socket hole is provided with at least two spaced ball sockets, said ball sockets being spaced from each other by lands, each ball socket having a pair of flats facing each other and aligned along a transverse axis passing through said rear portion and said nose pad, said depending free end portion of said mounting arm terminating in a detent ball, said detent ball having a pair of opposed flats which are positioned to interengage any pair of the flats facing each other in said socket hole, said detent ball resiliently interfitting with any one of said ball sockets so that the nose pad is capable of a limited lateral pivotal movement about the vertical axis of the free end portion to adjustably conform to a wearer's nose.

* * * * *